United States Patent
Chang

(10) Patent No.: US 12,133,087 B2
(45) Date of Patent: Oct. 29, 2024

(54) WIRELESS SIGNAL EXTENDING METHOD, ELECTRONIC DEVICE AND COMPUTER-READABLE STORAGE MEDIUM

(71) Applicant: Nanning FuLian FuGui Precision Industrial Co., Ltd., Nanning (CN)

(72) Inventor: Yong-Huang Chang, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 427 days.

(21) Appl. No.: 17/508,266

(22) Filed: Oct. 22, 2021

(65) Prior Publication Data
US 2023/0125978 A1 Apr. 27, 2023

(51) Int. Cl.
*H04W 16/26* (2009.01)
*G08B 5/36* (2006.01)
*H04W 24/08* (2009.01)
*H04W 48/16* (2009.01)
*H04W 84/18* (2009.01)

(52) U.S. Cl.
CPC .......... *H04W 16/26* (2013.01); *H04W 24/08* (2013.01); *H04W 48/16* (2013.01); *G08B 5/36* (2013.01); *H04W 84/18* (2013.01)

(58) Field of Classification Search
CPC ..... H04W 16/26; H04W 24/08; H04W 48/16; H04W 84/18; G08B 5/36
USPC ......................................................... 370/254
See application file for complete search history.

(56) References Cited

U.S. PATENT DOCUMENTS

| | | | | |
|---|---|---|---|---|
| 2006/0002326 A1* | 1/2006 | Vesuna | .................. | H04W 16/18 370/328 |
| 2020/0322216 A1* | 10/2020 | Singla | .................... | H04W 12/06 |
| 2021/0136868 A1* | 5/2021 | Nakajima | ............. | H04W 76/15 |
| 2022/0046643 A1* | 2/2022 | Ganapathy | ........ | H04W 72/0453 |

FOREIGN PATENT DOCUMENTS

| | | | |
|---|---|---|---|
| CN | 105228165 A | | 1/2016 |
| CN | 112752354 A | | 5/2021 |
| TW | 202014040 A | | 4/2020 |
| WO | WO 2022035486 | * | 2/2022 |

OTHER PUBLICATIONS

Title of the article :The App Wireless Network Tool | Wifi Analyzer to instantly display the strength of the surrounding wireless signals name of the author:Zhenghan Luo publish date:December 24, 2012.

* cited by examiner

*Primary Examiner* — Hermon Asres
(74) *Attorney, Agent, or Firm* — ScienBiziP, P.C.

(57) ABSTRACT

A wireless signal extending method is disclosed. A link between an electronic device and a first network node access point (AP) is generated. The electronic device connects to the first network node AP according to backhaul information. It is determined whether a location where the quality of connection signals with the first network node AP meets a preset value is discovered. If a first location where the quality of connection signals with the first network node AP meets the preset value is discovered, a second network node AP is placed at the first location. The second network node AP is enabled to enter in a pairing mode. A push button configuration (PBC) function of the first network node AP is remotely triggered to automatically pair the first network node AP and the second network node AP.

8 Claims, 3 Drawing Sheets

WIRELESS SIGNAL EXTENDING METHOD, ELECTRONIC DEVICE AND COMPUTER-READABLE STORAGE MEDIUM

BACKGROUND

1. Technical Field

The disclosure relates to network connection methods, and more particularly to a wireless signal extending method for an electronic device and a computer program product using the method.

wireless signal extending method, electronic device and computer-readable storage medium

2. Description of Related Art

Consumers having multiple mobile devices, such as smart phones, laptops, tablets and smart watches, may want to keep those devices connected to the Internet wherever they are, even at home. The demand for wireless fidelity (Wi-Fi) connections in homes has increased, and consequently the expectations for the quality of network connections have also increased. Traditionally, a single wireless router constitutes a Wi-Fi network. Such configuration may not cover all regions of a home.

Wi-Fi EasyMesh is a certification proposed by the Wi-Fi Alliance, which is a standardized method for realizing multi-access point wireless networks. The Wi-Fi EasyMesh enables network devices from different manufacturers to connect to the network and configure and communicate with each other to establish a self-adjusting network, providing a larger and unified coverage.

However, finding a location with good signal quality in the Wi-Fi EasyMesh wireless network to place an AP may not be easy.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

Figure 1:
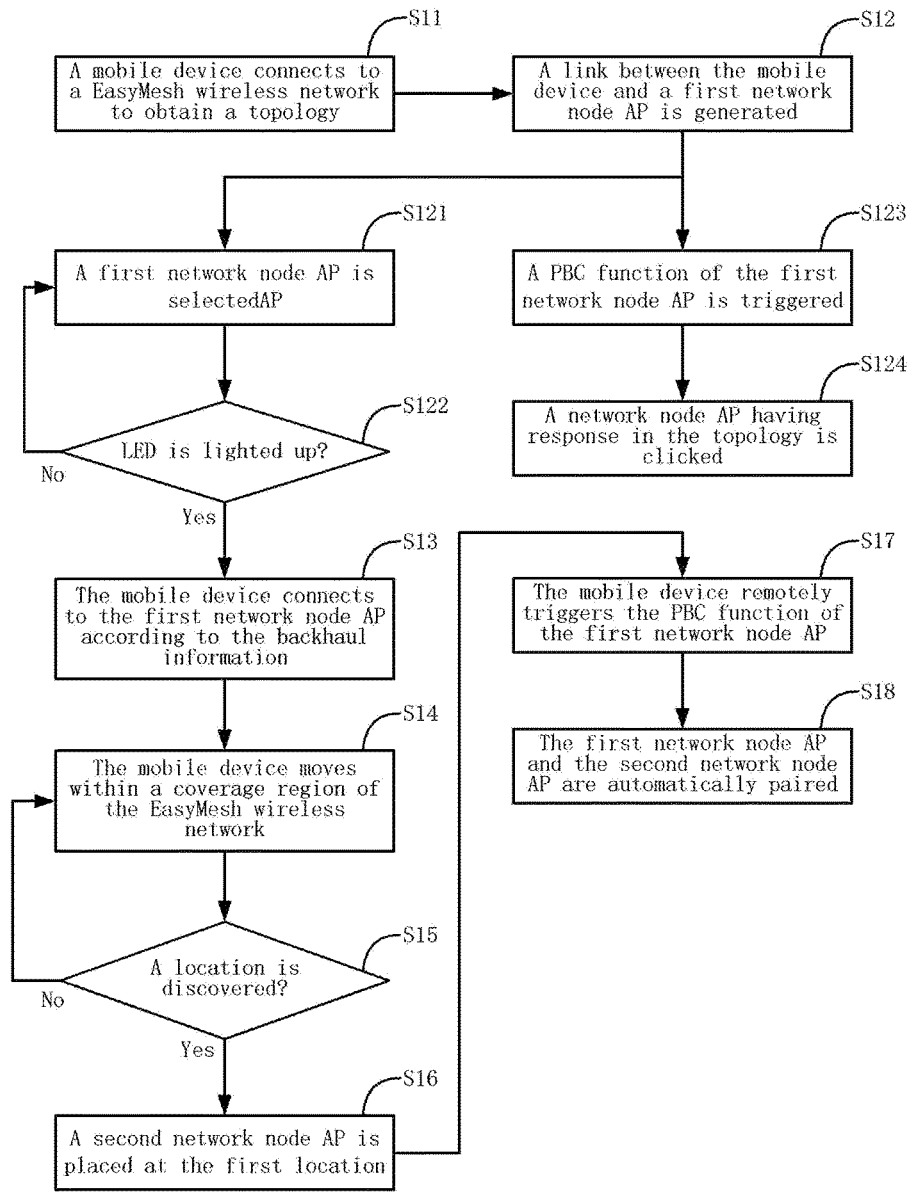
FIG. 1 is a flowchart of an embodiment of a wireless signal extending method of the preset disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a flowchart of an embodiment of a wireless signal extending method, applied in an electronic device, of the preset disclosure. The order of the steps in the flowchart can be changed and some steps can be omitted according to different requirements.

In block S11, an embodiment of an electronic device, for example, a mobile device, of the present invention connects to an EasyMesh wireless network and then obtains a topology of the EasyMesh wireless network.

In block S12, a link between the electronic device and a network node access point (AP) to be extend, for example, a first network node AP, is generated using the following two ways, including the steps S121 and S122 and the steps S123 and S124.

In block S121, the first network node AP in the topology is clicked.

In block S122, it is determined whether a light-emitting diode (LED) light is lighted up.

In block S123, a push button configuration (PBC) function of the first network node AP is triggered.

In block S124, a network node AP, having response, in the topology is clicked. The network node AP having response refers to the first network node AP in the topology.

In block S13, if the LED light of the first network node AP is lighted up or if the first network node AP in the topology is triggered, backhaul information of the first network node AP is retrieved and the electronic device connects to the first network node AP according to the backhaul information.

In block S14, the electronic device moves within a coverage region of the EasyMesh wireless network.

In block S15, it is determined whether a location where the quality of connection signals with the first network node AP meets a preset value is discovered. If the location where the quality of connection signals with the first network node AP meets the preset value is not discovered, the process proceeds to the step S104 that the electronic device keeps moving within the coverage region of the EasyMesh wireless network.

In block S16, if the location where the quality of connection signals with the first network node AP meets the preset value is discovered, for example, a first location, an AP to be newly added to the EasyMesh wireless network, for example, a second network node AP, is placed at the first location. The second network node AP is then enabled to enter in a pairing mode. At this time, the second network node AP is configured and displayed in the topology of the EasyMesh wireless network.

In block S17, the electronic device remotely triggers the PBC function of the first network node AP.

In block S18, the first network node AP and the second network node AP are automatically paired.

Figure 2:
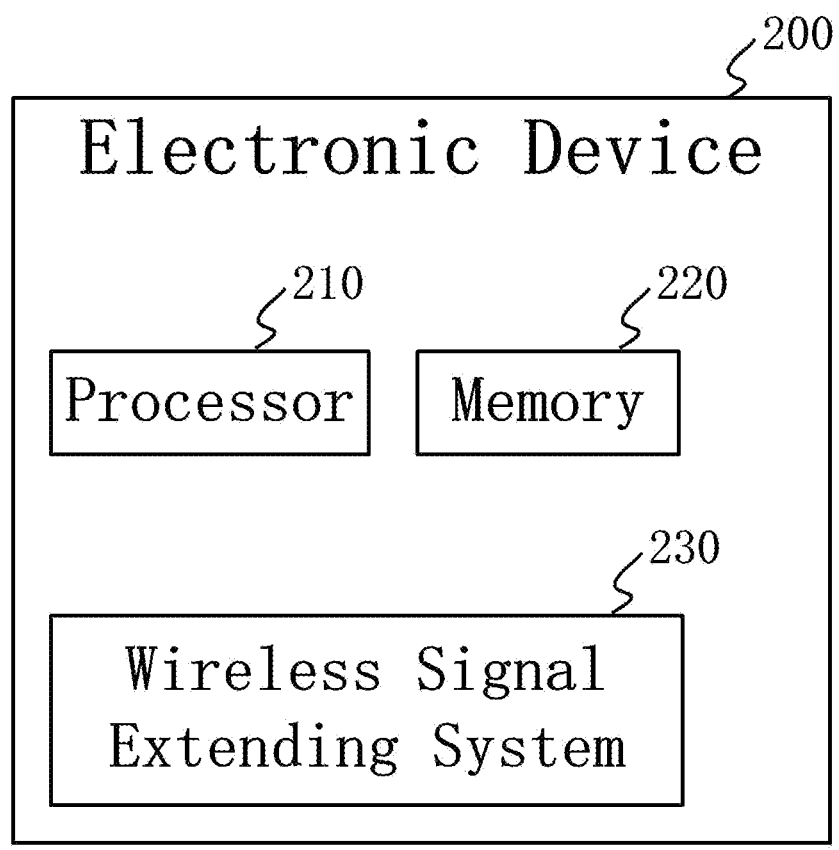
FIG. 2 is a block diagram of an embodiment of the hardware architecture of an electronic device using the method of the preset disclosure.

FIG. 2 is a block diagram of an embodiment of the hardware architecture of an electronic device using the wireless signal extending method of the preset disclosure. The electronic device 200 may, but is not limited to, connect to a processor 210, a memory 220, and a wireless signal extending system 230 via system buses. The electronic device 200 shown in FIG. 2 may include more or fewer components than those illustrated, or may combine certain components.

The memory 220 stores a computer program, such as the wireless signal extending system 230, which is executable by the processor 210. When the processor 210 executes the wireless signal extending system 230, the blocks in one embodiment of the wireless signal extending method applied in the electronic device 200 are implemented, such as blocks S11 to S18 shown in FIG. 1.

It will be understood by those skilled in the art that FIG. 2 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the wireless signal extending system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The wireless signal extending system 230 can be partitioned into one or more modules/units that are stored in the memory 220 and executed by the processor 210. The one or more modules/units may be a series of computer program instructions capable of performing particular functions of the wireless signal extending system 230.

Figure 3:
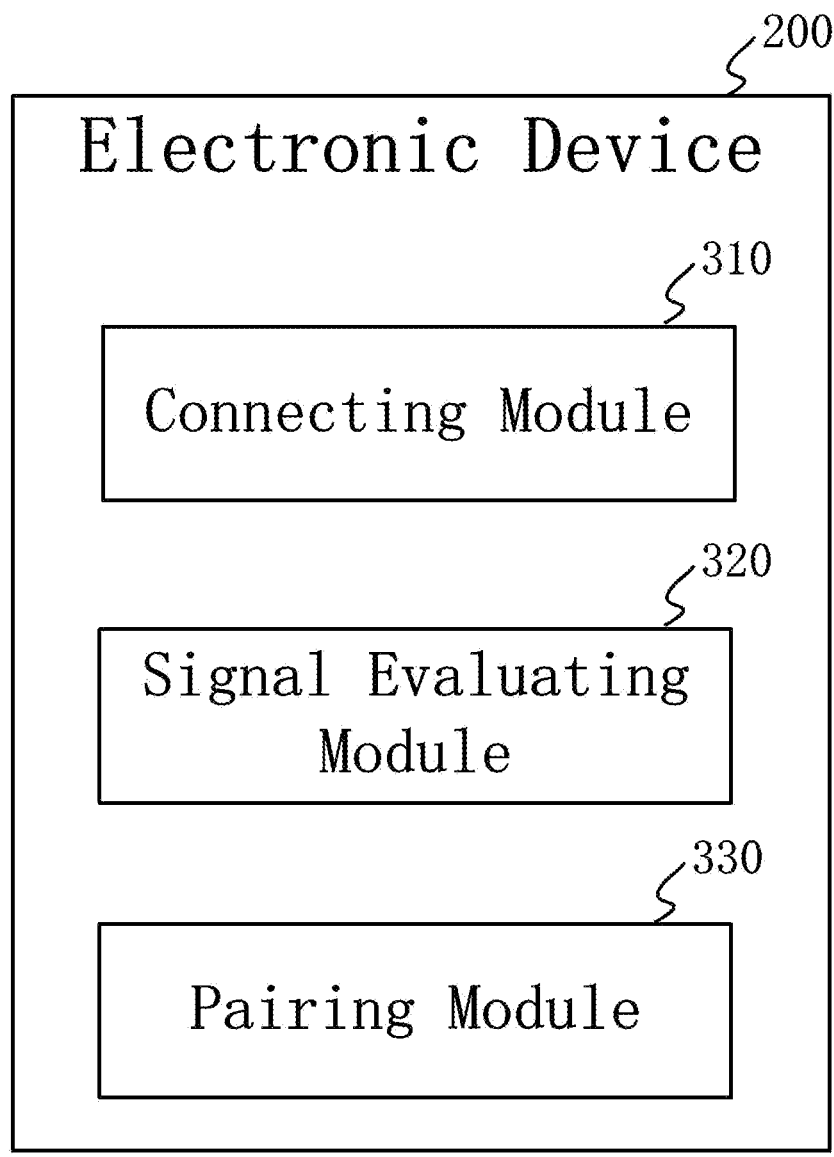
FIG. 3 is a schematic diagram of functional blocks of the electronic device using the method according to an embodiment of the preset disclosure.

FIG. 3 is a schematic diagram of an embodiment of functional blocks of the electronic device using the method of the preset disclosure.

The electronic device 200, such as a mobile device, comprises a connecting module 310, a signal evaluating module 320 and a pairing module 330.

The connecting module 310 enables the electronic device 200 to connect to a EasyMesh wireless network and then obtains a topology of the EasyMesh wireless network, and generates a link between the electronic device 200 and a network node AP to be extend, for example, a first network node AP, using the following two ways:
1) selecting the first network node AP in the topology, and determining whether an LED light is lighted up; and
2) triggering a PBC function of the first network node AP, and clicking a network node AP, having response, in the topology, for example, the first network node AP.

If the LED light of the first network node AP is lighted up or if the first network node AP in the topology is triggered, the connecting module 310 retrieves backhaul information of the first network node AP and enables the electronic device 200 to connect to the first network node AP according to the backhaul information.

The electronic device 200 moves within a coverage region of the EasyMesh wireless network. The signal evaluating module 320 obtains connection signals from different locations and determines whether a location where the quality of connection signals with the first network node AP meets a preset value is discovered. If the location where the quality of connection signals with the first network node AP meets the preset value is not discovered, the electronic device 200 keeps moving within the coverage region of the EasyMesh wireless network.

If the location where the quality of connection signals with the first network node AP meets a preset value is discovered, for example, a first location, an AP to be newly added to the EasyMesh wireless network, for example, a second network node AP, is placed at the first location. The second network node AP is then enabled to enter in a pairing mode. At this time, the second network node AP is configured and displayed in the topology of the EasyMesh wireless network.

The pairing module 330 remotely triggers the PBC function of the first network node AP so that the first network node AP and the second network node AP are automatically paired.

The embodiment of the wireless signal extending method uses a smart phone to replace the newly added AP to establish a backhaul link with a backhaul AP of a network node AP to be extended. A location having good signal quality providing better transmission quality can be discovered without the limit by power cables and sockets.

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:
1. A wireless signal extending method executable by an electronic device, comprising:
    connecting to an EasyMesh wireless network to obtain a topology of the EasyMesh wireless network;
    generating a link between the electronic device and a first network node access point (AP), wherein the first network node AP is a network node AP to be extend;
    retrieving backhaul information of the first network node AP and enabling the electronic device to connect to the first network node AP according to the backhaul information;
    enabling the electronic device to move within a coverage region of the EasyMesh wireless network;
    determining whether a location where the quality of connection signals with the first network node AP meets a preset value is discovered
    if a first location where the quality of connection signals with the first network node AP meets the preset value is discovered, placing a second network node AP at the first location, wherein the second network node AP is an AP to be newly added to the EasyMesh wireless network;

enabling the second network node AP to enter in a pairing mode; and remotely triggering a push button configuration (PBC) function of the first network node AP to automatically pair the first network node AP and the second network node AP.

2. The method of claim 1, wherein the step of generating the link between the electronic device and the first network node AP further comprises: clicking the first network node AP in the topology; and determining whether a light-emitting diode (LED) light is lighted up.

3. The method of claim 1, wherein the step of generating the link between the electronic device and the first network node AP further comprises: triggering the PBC function of the first network node AP; and clicking a network node AP, having response, in the topology.

4. The method of claim 1, further comprising: if the location where the quality of connection signals with the first network node AP meets the preset value is not discovered, enabling the electronic device to keep moving within the coverage region of the EasyMesh wireless network.

5. A non-transitory computer-readable storage medium storing game program which causes a computer to execute:
a process of connecting to an EasyMesh wireless network to obtain a topology of the EasyMesh wireless network;
a process of generating a link between the electronic device and a first network node AP, wherein the first network node AP is a network node AP to be extend;
a process of retrieving backhaul information of the first network node AP and enabling the electronic device to connect to the first network node AP according to the backhaul information;
a process of enabling the electronic device to move within a coverage region of the EasyMesh wireless network;
a process of determining whether a location where the quality of connection signals with the first network node AP meets a preset value is discovered
a process of placing a second network node AP at the first location if a first location where the quality of connection signals with the first network node AP meets the preset value is discovered, wherein the second network node AP is an AP to be newly added to the EasyMesh wireless network;
a process of enabling the second network node AP to enter in a pairing mode; and a process of remotely triggering a push button configuration (PBC) function of the first network node AP to automatically pair the first network node AP and the second network node AP.

6. The non-transitory computer-readable storage medium of claim 5, wherein the process of generating the link between the electronic device and the first network node AP further comprises: a process of clicking the first network node AP in the topology; and a process of determining whether an LED light is lighted up.

7. The non-transitory computer-readable storage medium of claim 5, wherein the process of generating the link between the electronic device and the first network node AP further comprises: a process of triggering the PBC function of the first network node AP; and a process of clicking a network node AP, having response, in the topology.

8. The non-transitory computer-readable storage medium of claim 5, further comprising: a process of enabling the electronic device to keep moving within the coverage region of the EasyMesh wireless network if the location where the quality of connection signals with the first, network node AP meets the preset value is not discovered.

* * * * *